United States Patent [19]
Couvillon

[11] 3,953,849
[45] Apr. 27, 1976

[54] AUTOMATICALLY CENTERED PULSED RADAR RECEIVER

[75] Inventor: James B. Couvillon, Dallas, Tex.

[73] Assignee: Texas Instruments Incorporated, Dallas, Tex.

[22] Filed: Aug. 6, 1974

[21] Appl. No.: 495,163

[52] U.S. Cl. ............................................. 343/7 A
[51] Int. Cl.² ........................................... G01S 9/02
[58] Field of Search .................................. 343/7 A

[56] References Cited
UNITED STATES PATENTS
3,707,718    12/1972    Ames ........................... 343/7 A X

*Primary Examiner*—T. H. Tubbesing
*Attorney, Agent, or Firm*—Harold Levine; Rene' E. Grossman; Alva H. Bandy

[57] ABSTRACT

Disclosed is a magnetron powered selectable pulse-width radar system having minimum receiver bandwidth for each pulsewidth and automatic centering of the intermediate frequency at the true center of the input filter pass band. A frequency discriminator adjusts the local oscillator frequency after each transmitted pulse to cause the intermediate frequency on the return of that pulse to equal an internal adjustable frequency reference. The filtered IF noise signal between received pulses is compared to the internal reference by the frequency discriminator and its output is used to adjust the reference to equal the center frequency of the actual receiver input pass band.

6 Claims, 10 Drawing Figures

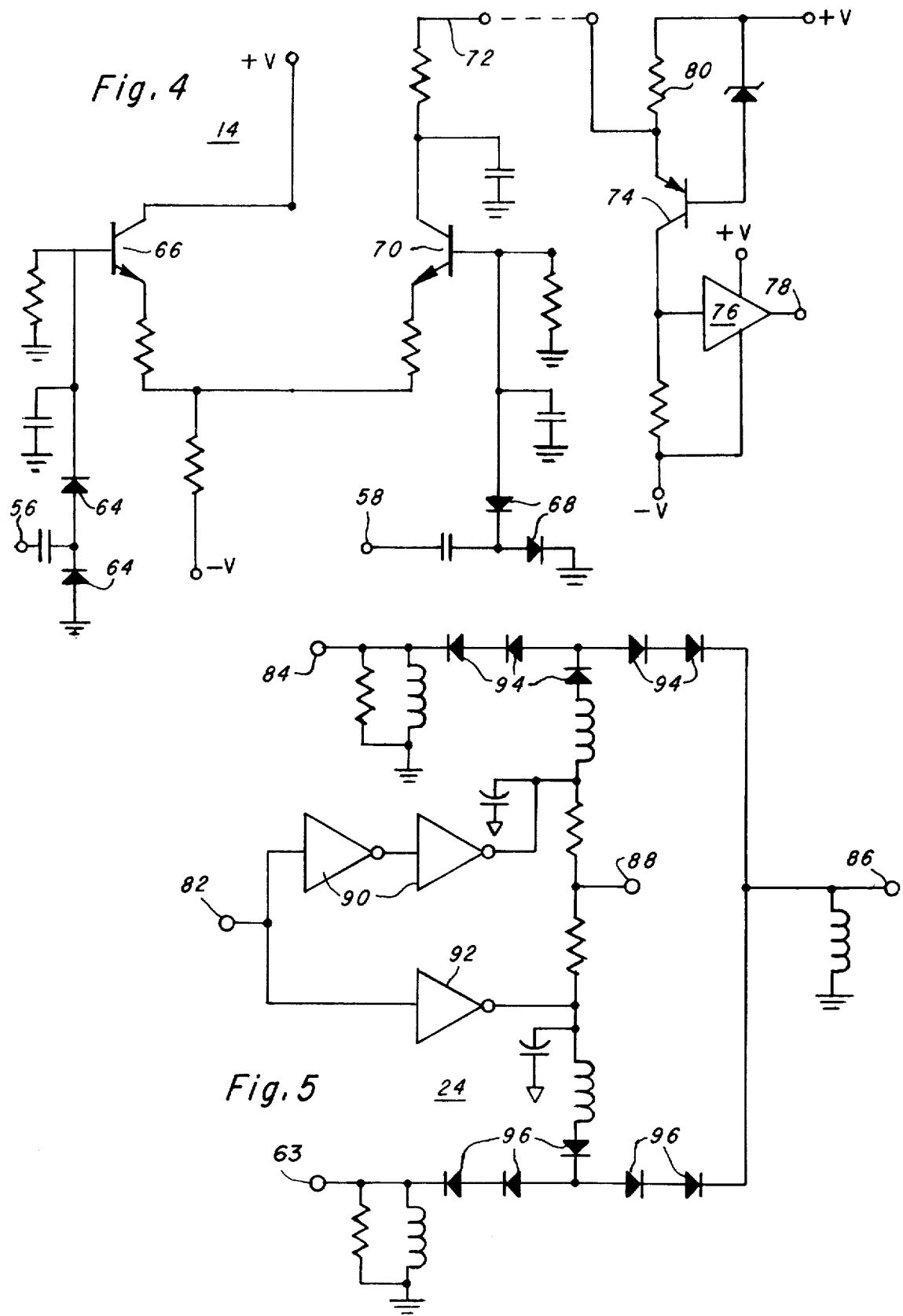

AUTOMATICALLY CENTERED PULSED RADAR RECEIVER

This invention relates to non-coherent pulsed radar systems.

Pulsed radars have long used magnetrons as efficient sources of high peak power transmitted pulses. Magnetrons are non-coherent, that is they do not generate exactly the same frequency signal during each pulse, and the receiver must be adjusted to receive each pulse. This adjustment is commonly made by mixing a portion of the transmitted pulse with the local oscillator signal and comparing the IF, intermediate frequency, generated to a reference in a frequency discriminator. The output of the frequency discriminator is an error signal proportional to the amount of frequency change needed in the local oscillator to cause the IF generated by the return pulse to be equal to the reference frequency. This error signal is used to adjust the local oscillator the proper amount to make the IF of the return pulse equal the reference frequency.

The reference frequency is initially adjusted to be equal to the center frequency of the pass band of the receiver filters. These filters need to be of minimum bandwidth consistent with the pulse width being transmitted to optimize system sensitivity. Various pulse widths are usually available to the radar operator with a different filter for each pulse width. It is practically impossible to produce a plurality of filters of different bandwidths having the identical center frequency. A fixed frequency reference therefore connot match the center frequency of all the filters. The reference and filter center frequencies drift with age and temperature, adding to the error between the reference and filter frequencies. The prior art solution to these problems has been to increase filter bandwidth enough to pass all desired signal. This solution also allows some unwanted signals to pass the filters and thereby reduces system sensitivity.

Accordingly, an object of the present invention is to provide a radar system which automatically centers the return pulse IF signal on the true receiver filter center frequency.

Another object of the present invention is to provide a radar system having minimum receiver filter band width consistent with the transmitted pulse width.

A further object of the present invention is to provide a radar system which automatically compensates for filter center frequency and frequency reference drift.

The above and other objects are achieved by providing an electronically adjustable frequency reference for the frequency discriminator. The noise passing through the receiver filters during the time between pulses is compared to the reference frequency by the frequency discriminator. The discriminator output is proportional to the error between the reference and actual filter center frequencies and is applied to the control input of the frequency reference to adjust the reference to the actual filter center frequency. The received signal is thereby continuously centered on the true center of the input filter passband.

Other objects, features and advantages of this invention will become better understood by reference to the following detailed description when read in conjunction with the accompanying drawings wherein:

FIG. 4 is an electrical schematic diagram of the video detector 14 of FIG. 1.

FIG. 5 is an electrical schematic diagram of the IF gate 24 of FIG. 1.

Figure 1:
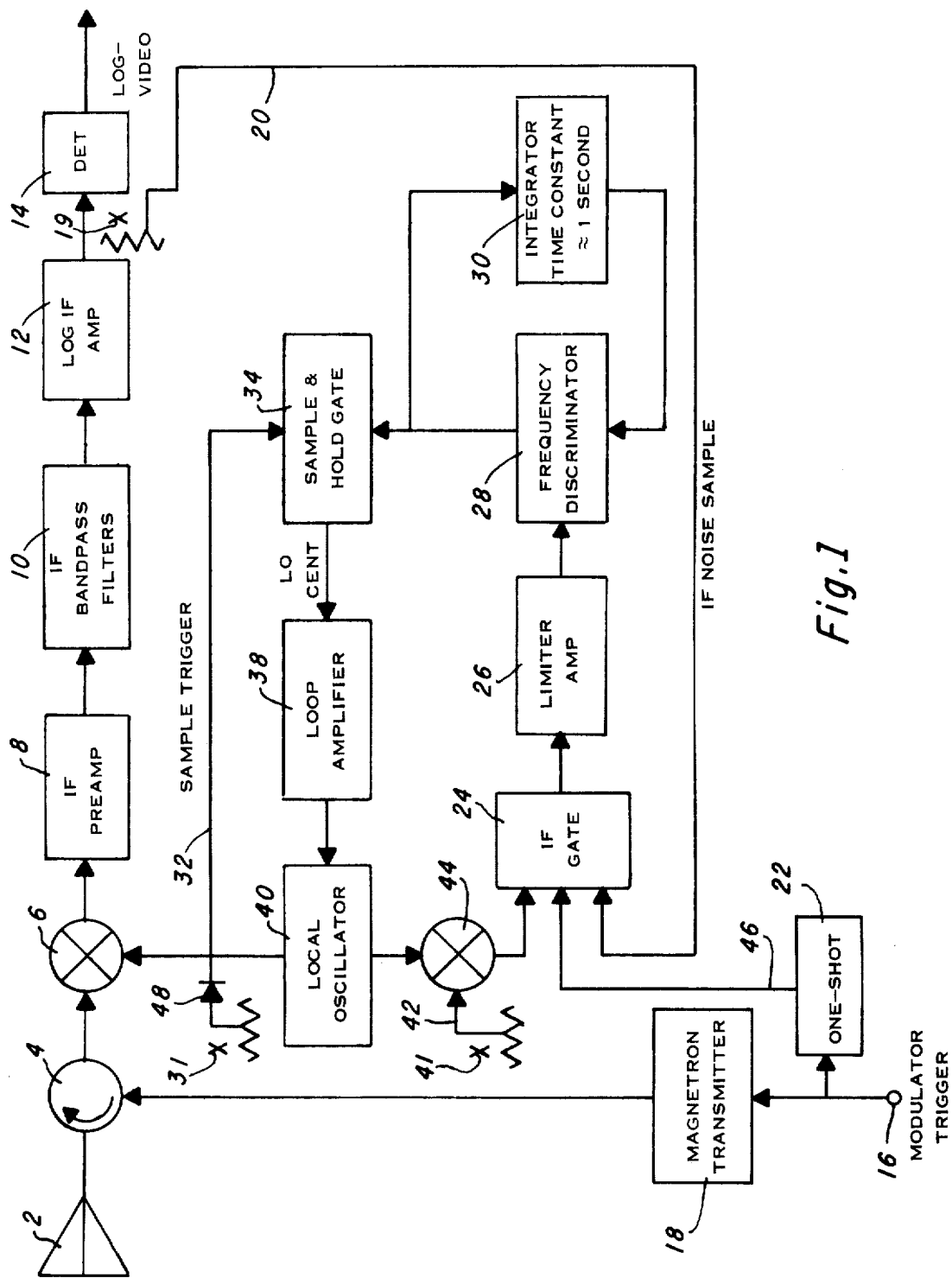
FIG. 1 is a block diagram of a non-coherent pulsed radar system constituting an embodiment of this invention.

A complete radar transmitter and receiver is shown in block diagram form in FIG. 1. The basic operation of such a system begins with the application of a pulse to the modulator trigger input 16 which causes the magnetron transmitter 18 to generate a burst of radio frequency energy which is coupled through circulator 4 to antenna 2, to be radiated towards a target.

The modulator trigger pulse is also coupled to one-shot multivibrator 22 which generates a pulse having a period longer than the transmitted pulse plus the time in which ground clutter signals are received by the antenna 2. This pulse drives IF gate 24 which is a single pole double throw switch. During the pulse from the one shot 22 the gate 24 couples a signal from a mixer 44 to a limiter amplifier 26. During the rest of the time, IF gate 24 couples signals from a coupler 19 to limiter amplifier 26.

A portion of the RF pulse generated by transmitter 18 is coupled by coupler 41 to mixer 44. A local oscillator 40 is also coupled to mixer 44 to generate an IF signal when mixed with the sampled RF pulse. This IF signal is coupled through gate 24 and limiter amplifier 26 to a frequency discriminator 28. Frequency discriminator 28 compares the IF signal from mixer 44 to an internal reference and generates an error signal proportional to the frequency difference. This error signal is coupled to the sampling input of a sample and hold circuit 34.

A second portion of the RF pulse generated by transmitter 18 is coupled by a coupler 31 to a detecting diode 48 which drives the trigger input of sample and hold gate 34. When this trigger signal is received, sample and hold gate 34 stores the frequency discriminator 28 output and reproduces it at its output. The output of sample and hold gate 34 is coupled to the input of a amplifier 38 which in turn drives the frequency control input of local oscillator 40. This signal coupled from frequency discriminator 28 to the local oscillator 40 changes the local oscillator frequency so that the IF signal generated in a mixer 6 upon the returns from the sampled pulse will be at the same frequency as the frequency discriminator reference.

Energy reflected from targets is received by antenna 2 and coupled through circulator 4 to mixer 6. In mixer 6 a signal from the local oscillator 40 is mixed with the received radio frequency signal to generate an IF signal which is coupled to the input of IF preamplifier 8, usually a low noise amplifier. The amplified IF signal is coupled from the output of amplifier 8 through bandpass filter 10 to logarithmic amplifier 12. The output of logarithmic amplifier 12 is coupled to detector 14 which produces a video output proportional to the envelope of the IF signal. The IF bandpass filters 10 comprise a plurality of bandpass filters having various band widths. When the radar operator selects a particular transmitted pulse width the corresponding bandpass filter is switched into the receiver path.

A portion of the receiver IF signal is sampled by coupler 19. During that part of the listening period in which no signals are received by antenna 2 the receiver IF signal is simply the broadband noise generated by amplifier 8, filtered by bandpass filter 10, and amplified by logarithmic amplifier 12.

Some radars under extreme clutter conditions receive clutter returns for the entire listening period. To eliminate the clutter returns during the centering cycles an attenuator is placed before the IF preamplifier 8 and actuated during the dead time.

The average frequency of the noise generated by amplifier 8 and filtered by filter 10 is equal to the actual center frequency of bandpass filter 10. This signal is coupled through gate 24 and limiter amplifier 26 to frequency discriminator 28. The frequency discriminator 28 output is then proportional to the difference in frequency between the actual filter center frequency and the discriminator reference frequency. This difference signal is applied to a reference frequency adjustment element to cause the reference frequency to match the true filter center frequency.

The discriminator 28 output is coupled to the frequency adjustment element by means of integrator 30 which has a time constant of about 1 second. Between pulses from the one-shot multivibrator 22 when the IF noise signal is fed back to discriminator 28, the integrator continuously integrates the discriminator output and by changing the reference frequency drives it essentially to zero output. Since an integrator has DC gain essentially equal to infinity, its use in a feedback loop can reduce errors essentially to zero. The integrator 30 also performs a holding function in that its output is constant as long as its input is zero.

Additionally, the integrator 30 performs a filtering function: Return pulses occur in the receiver IF signal between the one-shot multivibrator 22 pulses. These return signals are of very short duty cycle and pulsewidth so that they have essentially no effect on the integrator output. Likewise, the integrator is also connected during the one-shot pulse when the transmitted pulse is sampled. The transmitted pulse is of narrow pulsewidth and low duty cycle and has essentially no effect on integrator 30 output. During the remainder of the one-shot 22 pulse period discriminator 28 has zero input and output so the integrator 30 output remains constant.

Figure 2:
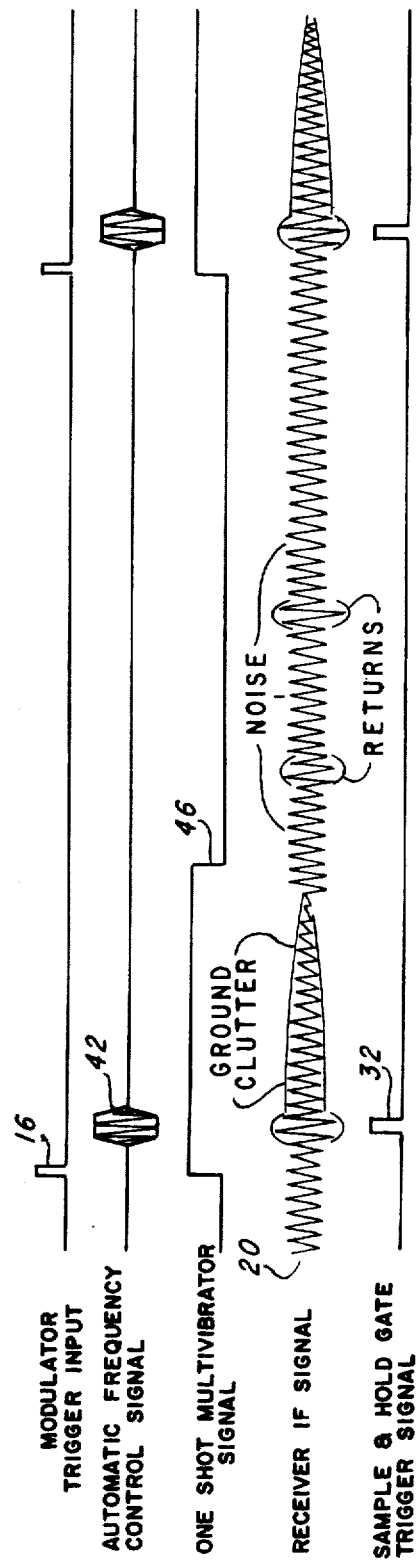
FIG. 2 is a timing diagram showing the sequence of events in the system of FIG. 1.

The operational sequence of events is illustrated by the timing diagram of FIG. 2 which illustrates the signals produced by the elements of FIG. 1. The modulator trigger input is a short pulse as shown in signal 16. This trigger pulse 16 starts the one-shot multivibrator 22 pulse shown in signal 46 and also causes the transmitter 18 to generate a burst of RF signal. The transmitter 18 output is sampled by coupler 41 to generate the automatic frequency control sample shown as signal 42. The transmitter output is also sampled by coupler 31 and rectified by diode 48 to generate the sample and hold gate trigger signal shown in signal 32. This trigger signal 32 causes the sample and hold gate 34 to store the discriminator 28 output generated in response to sample signal 42 mixed with local oscillator 40 output.

The receiver IF signal is sampled by coupler 19 to generate signal 20. During the one-shot pulse 46, the receiver IF signal 20 contains signal coupled from the transmitted pulse and ground clutter return signals immediately thereafter. After the one-shot multivibrator pulse 46 the receiver IF signal 20 contains only noise and target return signals. Only this portion of the receiver IF after the one-shot multivibrator pulse is coupled through IF gate 24 to the discriminator. As explained above, the output of integrator 30 is fixed by only the receiver IF noise signals. The discriminator frequency reference is thereby maintained essentially at the actual center frequency of the receiver bandpass filter.

Figure 3:
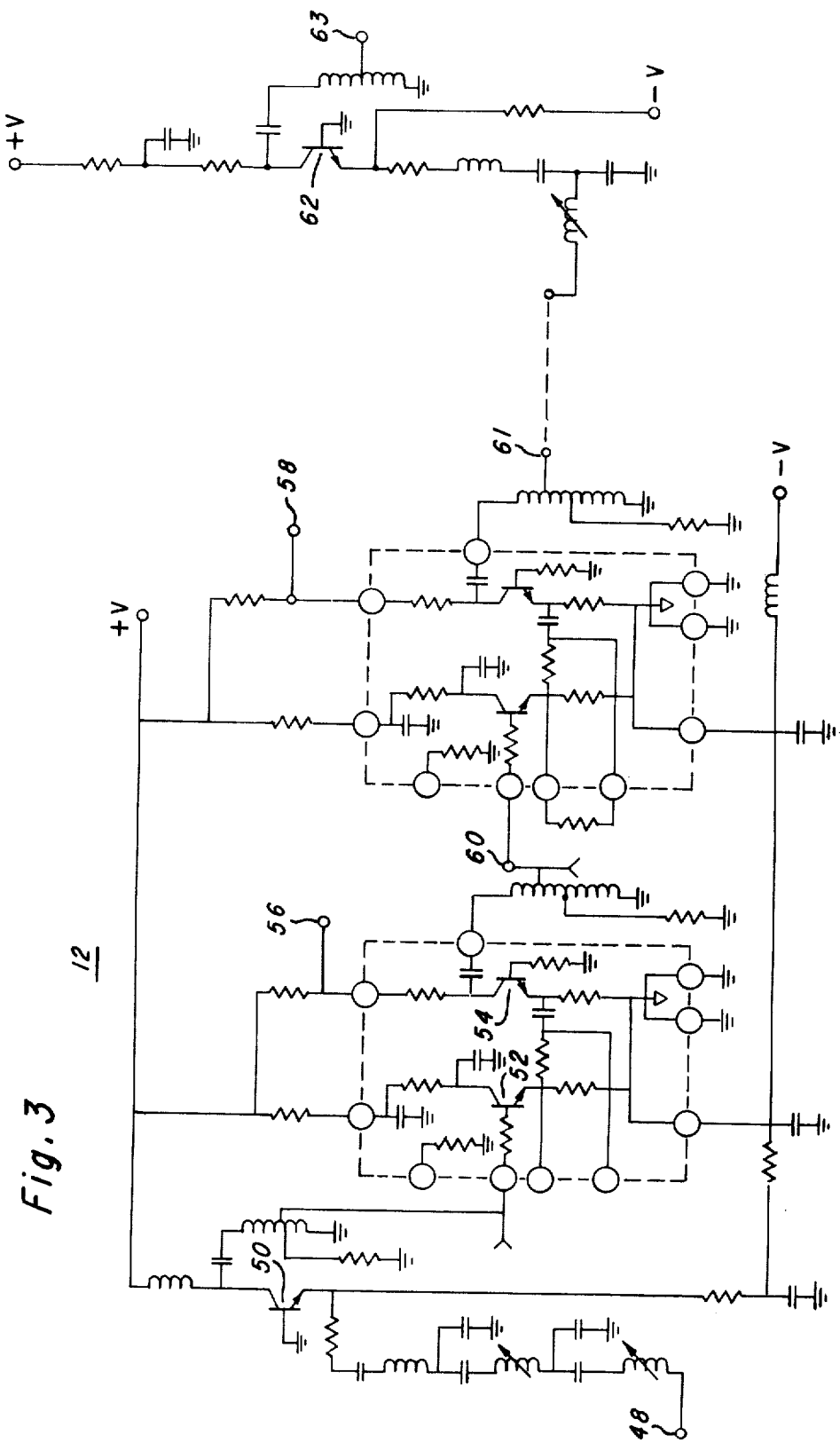
FIG. 3 is an electrical schematic diagram of the logarithmic IF amplifier 12 of FIG. 1.

FIG. 3 is a schematic diagram of the logarithmic IF amplifier 12 of the preferred embodiment of the present invention. The filtered IF signal from IF bandpass filter 10 (FIG. 1) is coupled to input 48 of the logarithmic amplifier. From input 48, the signal is coupled to the emitter of common base transistor 50 which buffers the input from the logarithmic amplifier stages. The logarithmic amplifier consists of six cascaded stages; two of which are shown to illustrate the coupling from the logarithmic stages to the video detector 14 illustrated in FIG. 4. Each logarithmic stage comprises a differential transistor pair 52 and 54. The amplified IF signals of the two stages shown appear at output 60 and 61, respectively, to be coupled to the following stages. Outputs 56 and 58 of the two stages shown are coupled to the video detector 14 shown in FIG. 4. The output of the final logarithmic stage is coupled to the emitter of common base transistor 62. Transistor 62 buffers the output of the final logarithmic stage and its collector drives the IF output 63.

FIG. 4 is a schematic diagram of the video detector 14 of the preferred embodiment of the present invention. One section of this detector which detects the output of a pair of the logarithmic stages of FIG. 3 is shown by way of illustration. Output 56 of the first logarithmic amplifier stage is rectified by diodes 64 to generate a positive voltage at the base of transistor 66. Output 58 of the second logarithmic amplifier stage is rectified by diodes 68 to generate a negative voltage at the base of transistor 70. The emitters of transistors 66 and 70 are coupled in differential amplifier configuration so that presence of a signal in the logarithmic amplifier stages will increase the current in the collector of transistor 66 and decrease the current in the collector of transistor 70. The collector of transistor 70 is coupled to junction 72 in common with the collectors of corresponding transistors in the other two detector sections. Resistor 80 coupled from the positive power supply to junction 72 supplies current to junction 72 which is either drawn by the detector transistors such as transistor 70 or a common base transistor 74 whose emitter is also coupled to junction 72. Thus, as IF signal level increases, the current through transistor 70 decreases and the current in transistor 74 increases by the same amount. The collector of transistor 74 drives a resistive load and is coupled to the input of operational amplifier 76. Operational amplifier 76 may be, for example, a National Semiconductor type NH0002 and it operates as a buffer to reproduce the voltage generated at the collector of transistor 74 at the video output 78.

FIG. 5 is a schematic diagram of the IF gate 24 of FIG. 1. The output of one-shot multivibrator 22 (FIG. 1) is coupled to input 82 of the gate. The output of AFC mixer 44 (FIG. 1) is coupled to input 84 of the gate. The output of the logarithmic amplifier 12 (FIG. 1) is coupled to input 63 of the gate. During the one-shot 22 pulse, when input 82 is high, the inverters 90 allow current from the positive power supply to input 88 to forward bias the diodes 94. When diodes 94 are forward biased the signal from input 84 is coupled through to output 86 of the gate. Between one-shot pulses, when input 82 is low, inverter 92 has an output which allows current from the positive power supply at input 88 to forward bias the diodes 96. When diodes 96 are forward biased the signal from input 63 is coupled to the output 86 of the gate.

Figure 6:
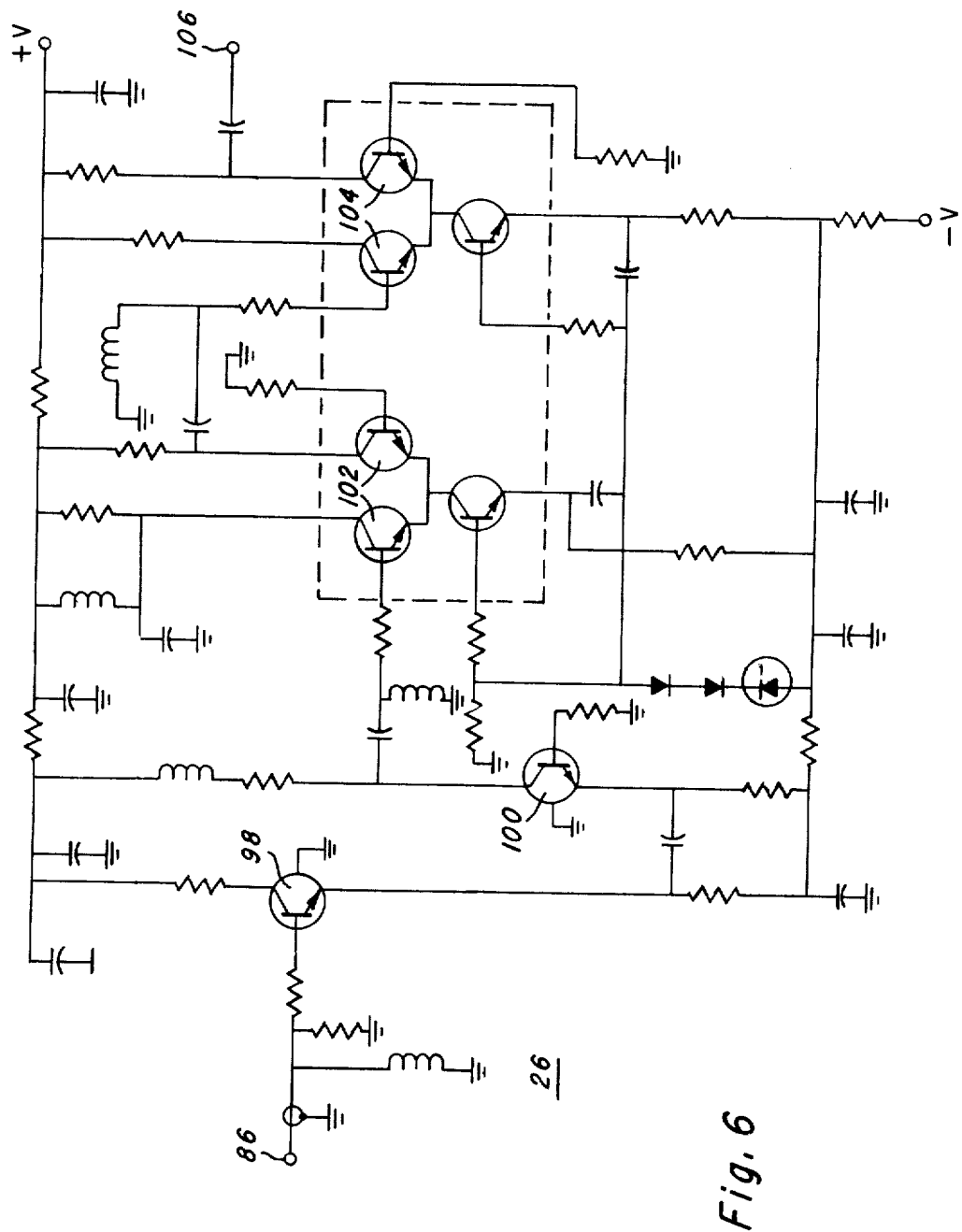
FIG. 6 is an electrical schematic diagram of the limiter amplifier 26 of FIG. 1.

FIG. 6 is a schematic diagram of the limiter amplifier 26 of FIG. 1. The output of IF gate 24 (FIG. 1) is coupled to input 86 of the limiter amplifier. Input 86 is coupled to the base of emitter-follower transistor 98 which buffers the input signal and couples it to the emitter of the common base transistor 100. The collector of transistor 100 drives the input of the two stage differential amplifier comprising transistor pairs 102 and 104. These two differential stages provide the limiting action desired to provide an essentially constant voltage level to the input of the frequency discriminator of FIGS. 7a and b. The limited IF signal appears at output 106.

Figure 7A:
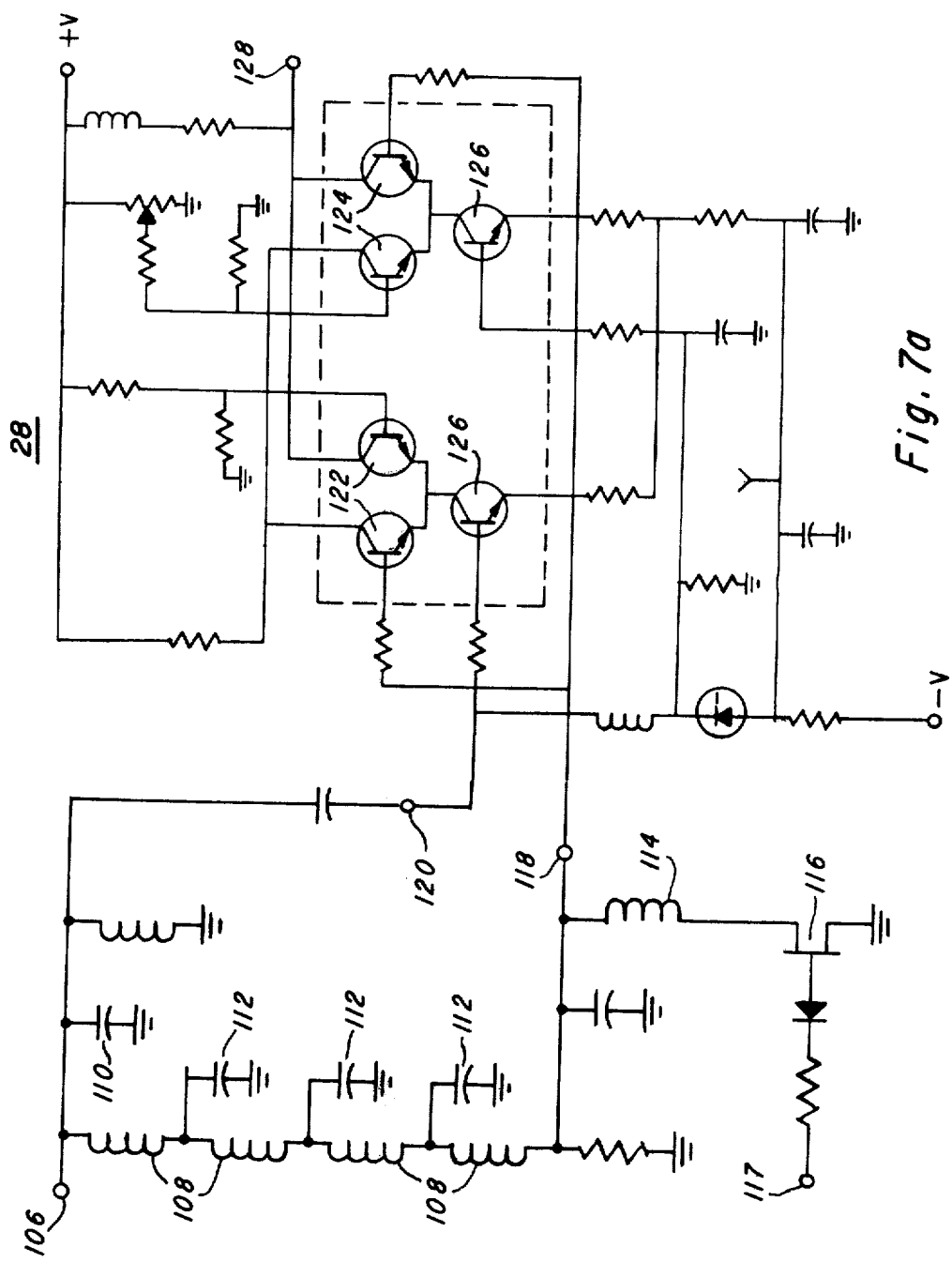
FIGS. 7a and 7b are an electrical schematic diagram of the frequency discriminator 28 of FIG. 1.
Figure 7B:
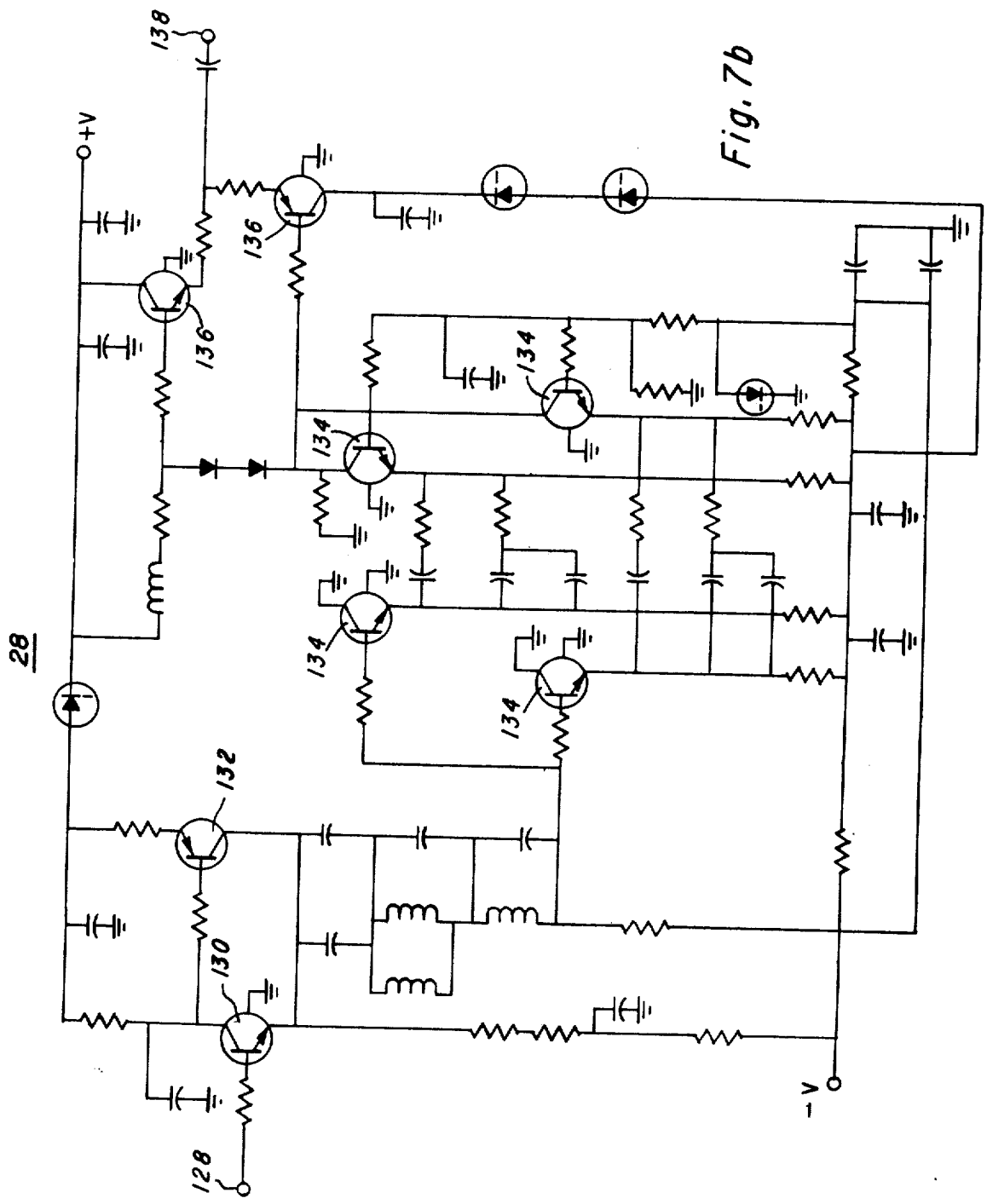

FIGS. 7a and 7b are a schematic diagram of the frequency discriminator 28 of FIG. 1. The output of the limiter amplifier 26 of FIGS. 1 and 6 is coupled to input 106 of the discriminator. The input 106 is coupled to a filter comprising inductors 108 and 114 and capacitors 110 and 112. A field effect transistor 116 is coupled from inductor 114 to ground and allows electronic adjustment of the center frequency and phase shift of this filter. This filter is the frequency reference of the frequency discriminator and the transistor 116 is the electronically adjustable tuning element. The output of the integrator 30 of FIG. 1 is connected to input 117 which is coupled to the gate of transistor 116 to automatically tune the frequency reference. The output of this frequency reference filter appears at junction 118 which is coupled to one input of each of the differentially connected transistor pairs 122 and 124. Discriminator input 106 is also coupled to one input of the differentially connected transistor pair 126. Transistor pair 126 also forms a pair of active current sources for the two differential pairs 122 and 124. Transistors 122, 124 and 126 form a phase detector whose output is a video signal proportional to the phase difference between the signals appearing at junctions 118 and 120. This video signal appears at junction 128.

When the IF signal at discriminator input 106 is at the nominal intermediate frequency, the frequency reference filter causes the phase difference between junctions 118 and 120 to be such that the output at junction 128 is zero. When the signal at input 106 deviates from the nominal intermediate frequency the phase shift between the signals at junction 118 and 120 changes in proportion to the frequency difference and output at 128 changes in the same proportion.

The discriminator output at junction 128 is coupled to a DC amplifier comprising transistors 130 and 132 (FIG. 7b). The output of the DC amplifier is coupled to an AC coupled amplifier comprising transistors 134. The output of transistors 134 drives the push-pull transistor pair 136 which is coupled to and drives output 138.

Figure 8:
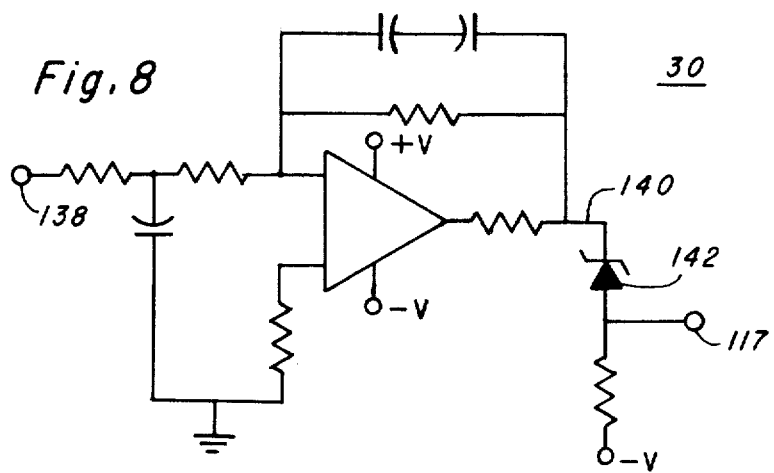
FIG. 8 is an electrical schematic diagram of the error feedback integrator 30 of FIG. 1.

FIG. 8 is a schematic diagram of the error feedback integrator 30 of FIG. 1. This is a typical integrator formed from an operational amplifier with capacitive feedback. The output of the frequency discriminator is coupled to integrator input 138. The integrator output 140 is level shifted by diode 142 to produce output 117 which is coupled to the frequency reference tuning input of the frequency discriminator of FIG. 7a.

Figure 9:
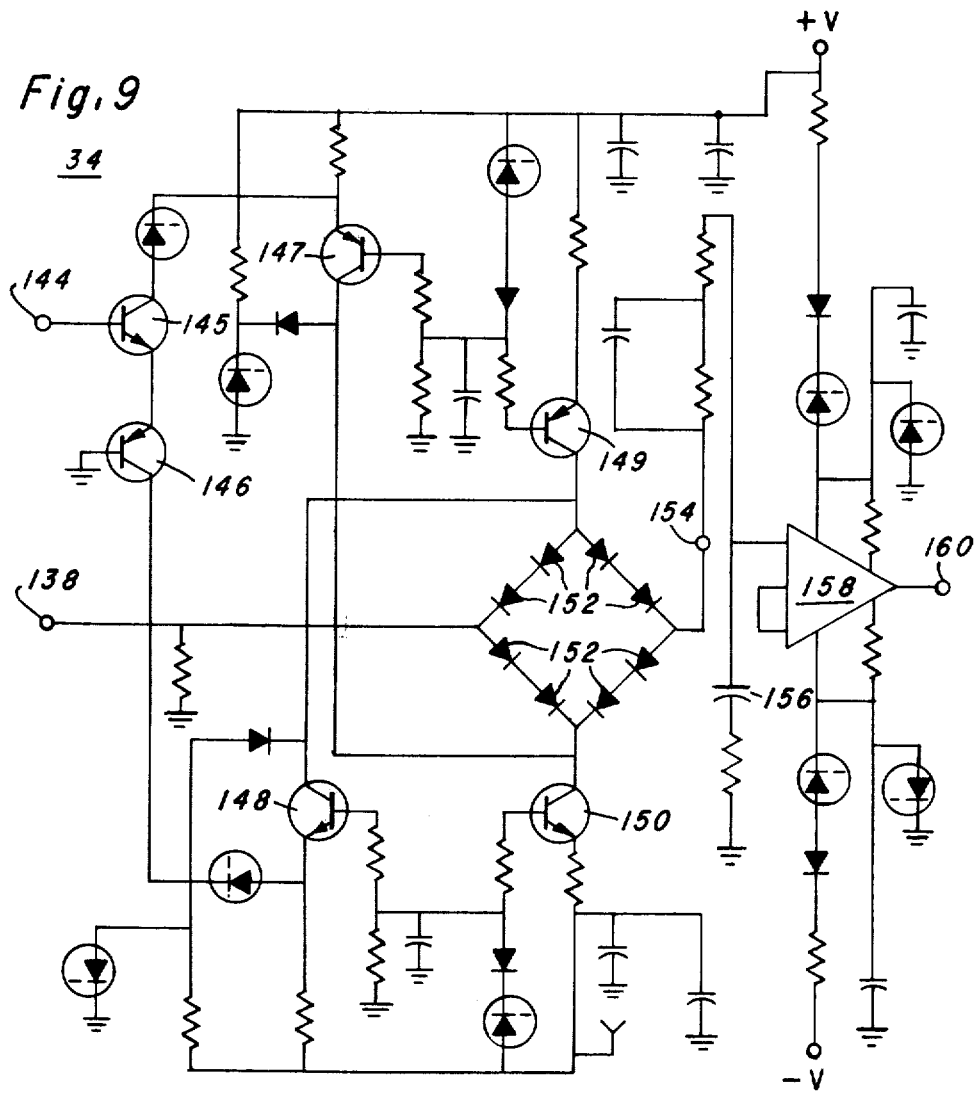
FIG. 9 is an electrical schematic diagram of the sample and hold gate 34 of FIG. 1.

FIG. 9 is a schematic diagram of the sample and hold gate 34 of FIG. 1. The sample trigger signal produced by coupler 31 and diode 48 of FIG. 1 is coupled to sample and hold trigger input 144. Input 144 controls switching transistors 145 through 150 to cause current to flow through the diodes of diode bridge 152 during the trigger pulse. The output of frequency discriminator 28, FIGS. 1 and 7a and b, is coupled to sampling input 138 of the sample and hold gate. When the diodes of diode bridge 152 are forward biased, input 138 is effectively coupled to junction 154. Storage capacitor 156 is coupled to junction 154 and is charged up to the voltage equal to the output of the frequency discriminator during the time of the sample trigger pulse. After the trigger pulse, when no more bias current flows through the diode bridge 152, there is essentially no path for current to flow to or from capacitor 156. Capacitor 156 therefore stores the output of the frequency discriminator between sample trigger pulses. Junction 154 is also coupled to the input of operational amplifier 158 which drives output 160. Output 160 is coupled through loop amplifier 38 (FIG. 1) to the frequency control input of the local oscillator 40 of FIG. 1.

Although the present invention has been shown and illustrated in terms of specific circuits, it will be apparent that changes or modifications can be made without departing from the scope of the invention as defined by the appended claims.

What is claimed is:

1. In a pulsed non-coherent radar system of the class in which each transmitted pulse is sampled and compared with a reference frequency to generate an error signal which controls a local oscillator frequency to cause the return signal intermediate frequency to equal the reference frequency, the improvement comprising frequency adjusting means coupled to the reference frequency source, sampling means for sampling the receiver intermediate frequency signal between return pulses, and frequency comparator means for comparing the sampled intermediate frequency to the reference frequency to generate a second error signal for driving the frequency adjusting means whereby the reference frequency is maintained equal to the actual center frequency of the receiver filter pass band.

2. A pulsed non-coherent radar system comprising:
   transmitter means for transmitting RF pulses towards a target,
   receiver means for receiving RF pulses reflected from a target and for generating an IF signal in response thereto,
   an electronically tunable frequency reference,
   a frequency discriminator coupled to the transmitter, the receiver, and the frequency reference for tuning the frequency reference to the frequency of the receiver thermal noise output and for maintaining the receiver IF at said noise frequency.

3. A pulsed non-coherent radar system comprising:

a. a detecting means for detecting the true center frequency of an input filter, said detecting means including an electronically tunable frequency reference, and a frequency discriminator coupled to the frequency reference and to the input filter for comparing the frequency of thermal noise passing through said filter to said frequency reference to produce a first error signal proportional to the frequency difference and for tuning the frequency reference to reduce said first error to zero; and b. adjusting means for adjusting a receiver intermediate frequency to said true center frequency of the input filter, said adjusting means including an electronically tunable local oscillator, and the frequency discriminator coupled to the frequency reference, the local oscillator, and a radio frequency transmitter for mixing the transmitter output signal with the local oscillator output to produce an intermediate frequency, comparing the intermediate frequency to the frequency reference to produce a second error signal proportional to the frequency difference, and beating the output of the local oscillator with the frequency of the second error signal to adjust the output frequency of the local oscillator and reduce said second error to zero.

4. A pulsed non-coherent radar system comprising:
a. an electronically tuned local oscillator;
b. a transmitter means for transmitting radio frequency pulses towards a target, said transmitter means including a mixer coupled to the transmitter means and electronically tuned oscillator;
c. a receiver means for receiving radio frequency pulses reflected from a target, a mixer coupled to the receiver means and electronically tuned local oscillator;
d. a frequency discriminator including a frequency reference means; and
e. a gating means for selectively coupling said frequency discriminator to the transmitter means and electronically tuned oscillator for producing an intermediate frequency, comparing the intermediate frequency with the frequency of the frequency reference means to produce a first error signal proportional to the frequency difference and applying the first error signal to the local oscillator to reduce the error to substantially zero, and coupling said frequency discriminator to said receiver means and said frequency reference for comparing the frequency of thermal noise passing through the receiver means to the frequency of frequency reference means and producing an error signal proportional to the frequency difference and applying said error signal to the frequency reference means to reduce the error signal to substantially zero.

5. A pulsed non-coherent radar system comprising:
a. a detecting means for detecting the true center frequency of an input filter, said detecting means including an electronically tunable frequency reference, and a frequency discriminator selectively coupled to the frequency reference and to the input filter for comparing the frequency of thermal noise passing through said filter to said frequency reference to produce a first error signal proportional to the frequency difference and for tuning the frequency reference to reduce said first error signal to zero; and b. an adjusting means for adjusting a receiver intermediate frequency to said true center frequency of the input filter, said adjusting means including an electronically tunable local oscillator, a radio frequency transmitter, and a mixer said mixer beating the local oscillator signal with the radio frequency transmitter output to produce an intermediate frequency signal, said mixer selectively coupled to the frequency discriminator for comparing the intermediate frequency signal with the frequency reference signal, said frequency discriminator producing a second error signal and applying said second error signal to the local oscillator for changing the local oscillator frequency to reduce said second error to zero.

6. A pulsed radar system comprising:
a. a RF transmitter means for selectively transmitting pulses of RF energy, said transmitter means including a modulator trigger, and a mixer for receiving a portion of the pulses of RF energy being transmitted;
b. an RF receiver means for detecting the pulses of RF energy reflected from a target, said receiver means including a mixer and a filter means coupled to said mixer for selectively passing transmitted pulse widths;
c. a local oscillator means for producing a carrier frequency for the transmitter means mixer for beating the oscillator carrier frequency with a sample of the RF pulses being transmitted, and for the receiver mixer for beating the local oscillator signal with reflected RF pulses;
d. a frequency discriminator including a tunable frequency reference means coupled to a phase detector;
e. gating means coupled to the radar modulator signal, transmitter mixer and receiver filter means for selectively coupling the output signal of the transmitter mixer to the frequency discriminator for producing an error signal proportional to the frequency difference for changing the carrier frequency of the local oscillator, and the output of the receiver filter means to the frequency discriminator for producing an error signal proportional to the frequency difference; and
f. an error feedback integrator coupled to the output of the frequency discriminator for feeding back the filter means frequency difference error signal to the tunable frequency reference means to automatically tune the frequency reference of the frequency discriminator whereby the carrier frequency of the local oscillator and the frequency of the tunable frequency reference is adjusted to produce zero error signals.

\* \* \* \* \*